United States Patent
Suetake

(10) Patent No.: US 7,084,802 B1
(45) Date of Patent: Aug. 1, 2006

(54) SIGNAL PROCESSING CIRCUIT

(75) Inventor: Naruki Suetake, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 25 days.

(21) Appl. No.: 11/144,014

(22) Filed: Jun. 3, 2005

(30) Foreign Application Priority Data

Feb. 22, 2005 (JP) .............................. 2005-045489

(51) Int. Cl.
*H03M 1/60* (2006.01)
(52) U.S. Cl. .................. 341/157; 341/155; 341/126; 375/206; 369/47
(58) Field of Classification Search ................ 341/126, 341/144, 155–157; 369/47, 48; 375/206
See application file for complete search history.

(56) References Cited

U.S. PATENT DOCUMENTS 5,432,564 A * 7/1995 Tonami ...................... 348/646
5,610,939 A * 3/1997 Takahashi et al. .......... 375/150
6,344,778 B1 * 2/2002 Nakamura et al. ............. 331/34
6,587,411 B1 * 7/2003 Hayashi .................... 369/47.29

FOREIGN PATENT DOCUMENTS

JP 11-160121 A 6/1999

* cited by examiner

*Primary Examiner*—Peguy Jeanpierre
*Assistant Examiner*—Lam T. Mai
(74) *Attorney, Agent, or Firm*—Sughrue Mion, PLLC

(57) ABSTRACT

A signal processing circuit can obtain a ratiometric output with high precision and high responsiveness in a relatively easy and simple way. A pulse generation circuit generates a pulse signal corresponding to an input signal. An integration part generates an integrated voltage having a time slope proportional to an input voltage with a duration specified by the pulse signal being set as an integration period. A hold part holds and outputs a difference voltage between a start voltage and an end voltage of the integrated voltage in the integration period. The integration period is specified at the timing of the pulse signal output from the pulse output circuit, and a ratiometric output is generated by sample holding the integral signal.

7 Claims, 9 Drawing Sheets

Vm : FLOW RATE SIGNAL
Vp : PULSE SIGNAL
Vref : SENSOR REFERENCE VOLTAGE

AT LARGE FLOW RATE

Vm : FLOW RATE SIGNAL
Vp : PULSE SIGNAL
Vref : SENSOR REFERENCE VOLTAGE

< IN CASE Vp IS FREQUENCY >

AT LOW FLOW RATE

AT LARGE FLOW RATE

<IN CASE Vp IS PWM>

AT LOW FLOW RATE

AT LARGE FLOW RATE

Vcom : FIXED VOLTAGE

Fout : FREQUENCY SIGNAL

SIGNAL PROCESSING CIRCUIT

BACKGROUND OF THE INVENTION

1. Field of the Invention

The present invention relates to a signal processing circuit for acquiring a ratiometric output, for instance, and more particularly, to such a signal processing circuit that can be applied to a thermal flowmeter or the like for detecting the flow rate of fluid (e.g., the amount of intake air used for a fuel control system of an internal combustion engine) by using a thermal resistance.

2. Description of the Related Art

In general, in a fuel control system of an internal combustion engine, a thermal flowmeter is used to detect the amount of intake air. As an output method for a signal processing circuit applied to such a thermal flowmeter, there have been known various methods such as a voltage output, a current output, a frequency output, a ratiometric output, and so on.

Here, in the case of a signal processing circuit using a method of generating a voltage output and a current output, if there exists an error in a reference power supply connected to a fuel control system when a flow rate signal is AD converted in the fuel control system, a flow rate error will occur, so a reference power supply of high precision is required so as to avoid such a situation.

On the other hand, a signal processing circuit using a method of generating a frequency output or a ratiometric output is known as an output method that does not need such a reference power supply of high precision. In a known signal processing circuit using a ratiometric output, a flow rate signal is once AD converted in a thermal flowmeter and thereafter is DA converted, based on a sensor reference voltage supplied from a fuel control system, into a signal, which is output from the thermal flowmeter.

In addition, as another known signal processing circuit using a ratiometric output method, there has been proposed one in which a peak value of a PWM signal generated in accordance with a flow rate signal is made as a reference voltage supplied from a fuel control system so as to smoothen the PWM signal to acquire a ratiometric output signal (see, for instance, a first patent document: Japanese patent application laid-open No. H11-160121).

In the above-mentioned known signal processing circuits, in order to reduce the influence of digital errors generated when AD conversion (or DA conversion) is carried out to acquire a ratiometric output, it is necessary to set the resolution of an AD conversion circuit (or DA conversion circuit) to a sufficiently fine value, thus posing a problem that the AD (or DA) conversion circuit becomes a large scale. Moreover, in case where a circuit configuration as described in the first patent document is applied, there arises another problem that a response delay in the ratiometric output will be caused upon smoothening the PWM signal corresponding to the flow rate signal.

SUMMARY OF THE INVENTION

Accordingly, the present invention is intended to solve the problems as referred to above, and has for its object to obtain a signal processing circuit which is capable of acquiring a ratiometric output of high precision and high responsiveness in a relatively simple way by specifying an integration period with a pulse signal that has a duration corresponding to a flow rate, without using an AD (or DA) conversion circuit in a ratiometric output method.

A signal processing circuit according to the present invention includes: a pulse generation part that generates a pulse signal corresponding to an input signal; an integration part that generates an integrated voltage having a time slope proportional to an input voltage with a duration specified by the pulse signal being set as an integration period; and a hold part that holds and outputs a difference voltage between a start voltage and an end voltage of the integrated voltage in the integration period.

According to the present invention, the scale or size of the circuit can be relatively simplified, and besides, it is possible to avoid errors generated in digital processing.

The above and other objects, features and advantages of the present invention will become more readily apparent to those skilled in the art from the following detailed description of preferred embodiments of the present invention taken in conjunction with the accompanying drawings.

DESCRIPTION OF THE PREFERRED EMBODIMENTS

Hereinafter, preferred embodiments of the present invention will be described in detail while referring to the accompanying drawings.

Embodiment 1

Figure 1:
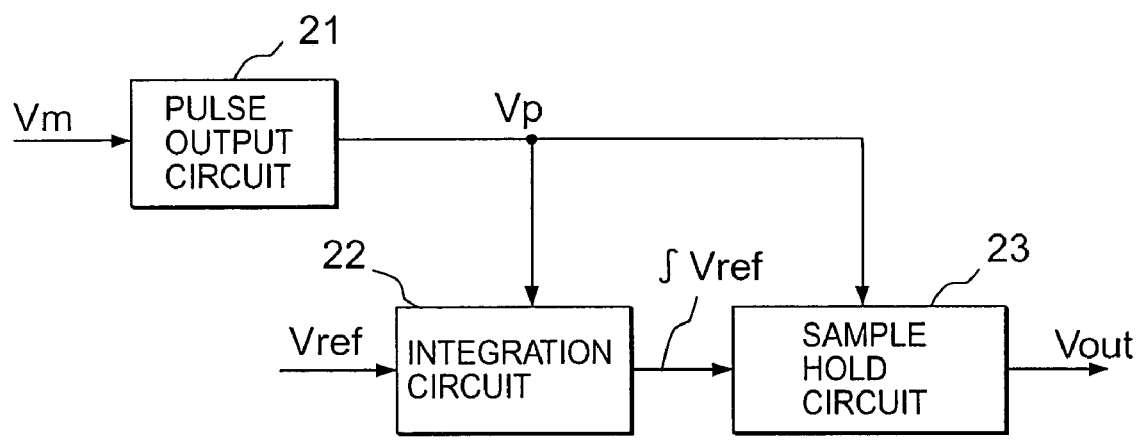
FIG. 1 is a block diagram showing an example of a ratiometric output configuration of a signal processing circuit according to a first embodiment of the present invention.

FIG. 1 is a block diagram that shows a signal processing circuit according to a first embodiment of the present invention, wherein an example of a circuit configuration is illustrated when the present invention is applied to a thermal flowmeter.

In FIG. 1, the signal processing circuit comprises a pulse output circuit 21, an integration circuit 22, and a sample hold circuit 23.

The pulse output circuit 21 generates a flow rate signal Vm from a physical quantity detection part such as, for instance, a thermal flowmeter (not shown), and generates a pulse signal Vp corresponding to a flow rate signal Vm. The integration circuit 22 is supplied, as an input voltage, with a sensor reference voltage Vref from a fuel control system (not shown) for instance, and generates, as an output signal, an integrated voltage $\int$ Vref that has a time slope (hereinafter referred to simply as a "slope") proportional to the sensor reference voltage Vref, with an integration period in the form of a duration specified by the pulse signal Vp.

The sample hold circuit 23 holds a difference voltage between a start voltage (ground level=0V) and an end voltage of the integrated voltage $\int$Vref in the integration period of the integration circuit 22 at the timing of the pulse signal Vp (to be described later), and generates a sample hold voltage signal as a ratiometric output signal Vout.

Next, reference will be made to the circuit operation of FIG. 1 when the pulse signal Vp is formed of a frequency signal while referring to timing charts (signal waveforms) shown in FIG. 2 through FIG. 5. FIG. 2 through FIG. 5 illustrates time-related changes at the respective levels of the pulse signal Vp, the integrated voltage $\int$ Vref, and the ratiometric output signal Vout. In FIG. 2 through FIG. 5, the pulse signal Vp includes an H (high) level period TH and an L (low) level period TL.

Figure 2:
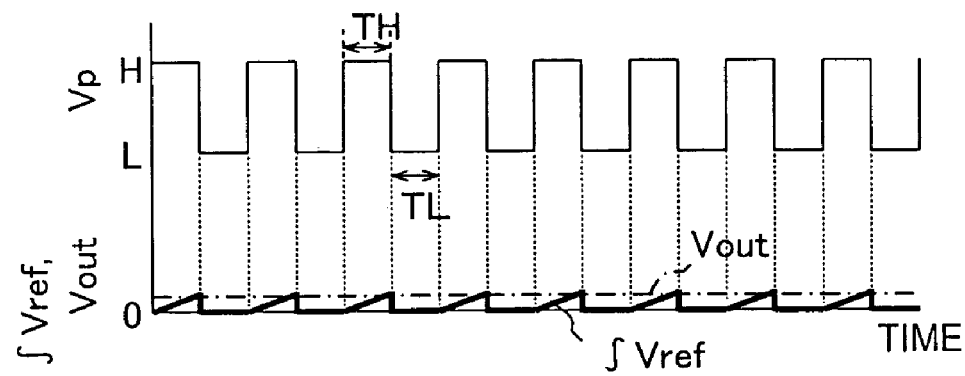
FIG. 2 is a timing chart illustrating an example of a first signal waveform when a ratiometric output is generated based on a pulse signal (frequency signal) at a low flow rate according to the first embodiment of the present invention.
Figure 3:
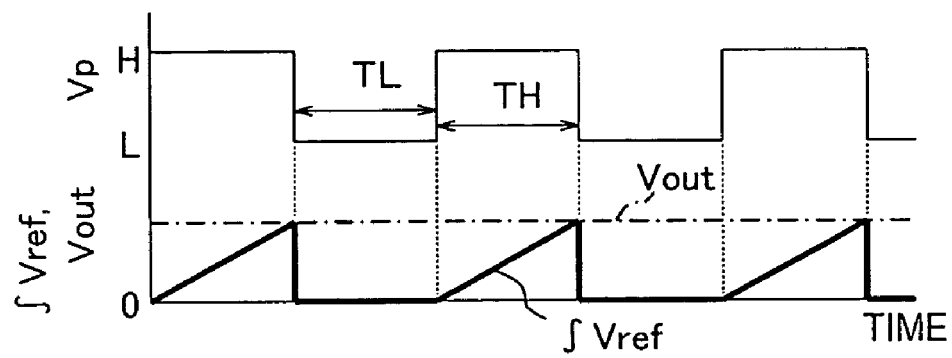
FIG. 3 is a timing chart illustrating an example of the first signal waveform when a ratiometric output is generated based on a pulse signal (frequency signal) at a large flow rate according to the first embodiment of the present invention.
Figure 4:
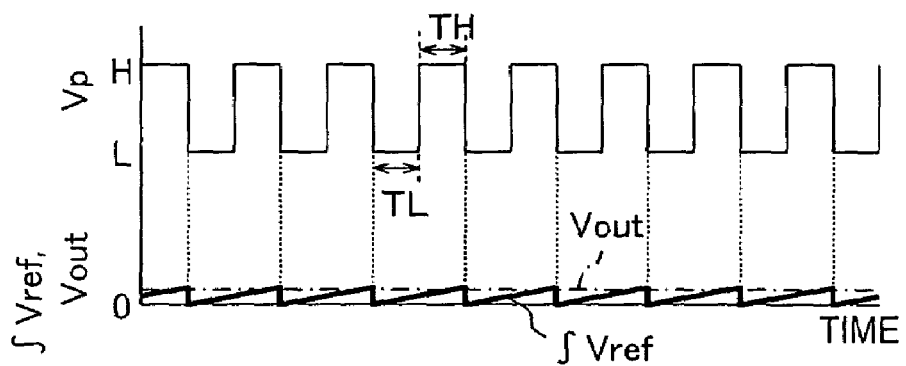
FIG. 4 is a timing chart illustrating an example of a second signal waveform when a ratiometric output is generated based on a pulse signal (frequency signal) at a low flow rate according to the first embodiment of the present invention.
Figure 5:
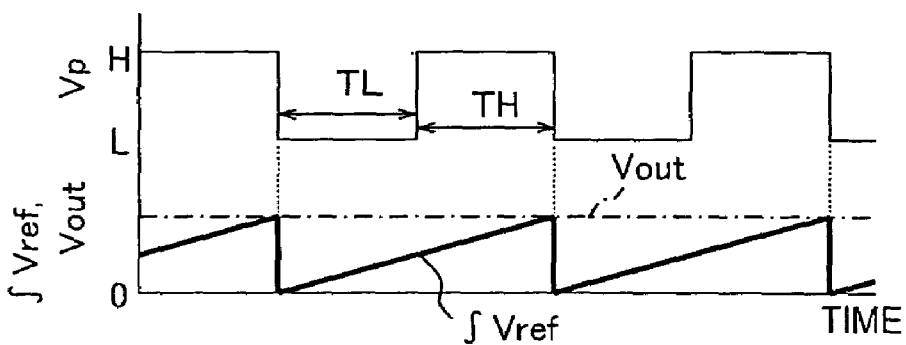
FIG. 5 is a timing chart illustrating an example of the second signal waveform when a ratiometric output is generated based on a pulse signal (frequency signal) at a large flow rate according to the first embodiment of the present invention.

FIG. 2 and FIG. 3 illustrate signal waveforms in the case where the H level period TH of the pulse signal Vp is set as an integration period of the integration circuit 22, and the L level period TL of the pulse signal Vp is set as a reset period of the integration circuit 22. On the other hand, FIG. 4 and FIG. 5 illustrate signal waveforms in the case where the entire period (TH+TL) of the pulse signal Vp (the sum of the H level period and the L level period) is set as an integration period of the integration circuit 22. In addition, FIG. 2 and FIG. 4 illustrate the signal waveforms in the case where the flow rate signal Vm indicates a low flow rate, and FIG. 3 and FIG. 5 illustrate the signal waveforms in the case where the flow rate signal Vm indicates a large flow rate.

First of all, reference will be made to the operation in the case where the H level period TH of the pulse signal Vp is set as the integration period of the integration circuit 22 while referring to FIG. 2 and FIG. 3. In this case, the integration circuit 22 starts integration at the timing at which the pulse signal Vp changes or switches from a low (L) level into a high (H) level. In addition, the sample hold circuit 23 holds the signal level of the integrated voltage $\int$ Vref (difference voltage) at the timing at which the pulse signal Vp changes or switches from the H level into the L level. Here, note that the integrated voltage $\int$ Vref becomes a ground state when the pulse signal Vp is at the L level (reset period).

FIG. 2 and FIG. 3 show the case where the sensor reference voltage Vref input to the integration circuit 22 is constant. If the sensor reference voltage Vref is constant in this manner, the slope of the integrated voltage $\int$Vref in the integration period (the H level period TH) is also constant. In addition, when the flow rate signal Vm indicates the low flow rate, the integration period (the H level period TH of the pulse signal Vp) becomes short, as shown in FIG. 2, so the level of the ratiometric output signal Vout (see alternate long and short dash lines) becomes low. On the other hand, when the flow rate signal Vm indicates the large flow rate, the integration period becomes long, as shown in FIG. 3, so the level of the ratiometric output signal Vout becomes high.

Though the sensor reference voltage Vref is made constant here, if the sensor reference voltage Vref rises, the slope of the integrated voltage $\int$ Vref becomes steep, so the level of the ratiometric output signal Vout becomes high. On the contrary, if the sensor reference voltage Vref falls, the slope of the integrated voltage $\int$ Vref becomes gradual, so the level of the ratiometric output signal Vout becomes low.

By setting the H level period TH of the pulse signal Vp to the integration period and by resetting the integral signal $\int$ Vref in the L level period TL of the pulse signal Vp, the integration period (the H level period TH) and the reset timing can be separated from each other. In this case, since there exists the reset period (the L level period TL), it is possible to reduce errors due to signal transmission as compared with the case where integration is started immediately after resetting (see FIG. 4 and FIG. 5).

In FIG. 2 and FIG. 3, the H level period TH of the pulse signal Vp is set as the integration period, and the switching timing from the H level to the L level of the pulse signal Vp is set as the hold timing of the integrated voltage $\int$ Vref, but on the contrary, the L level period TL of the pulse signal Vp may be set as the integration period, and the switching timing from the L level to the H level of the pulse signal Vp may be set as the hold timing of the integrated voltage $\int$ Vref. Also, a peak hold circuit may be used instead of the sample hold circuit 23.

Next, reference will be made to the operation in the case where the entire period (TH+TL) of the pulse signal Vp is set as the integration period of the integration circuit 22 while referring to FIGS. 4 and 5.

In FIG. 4 and FIG. 5, the integrated voltage $\int$ Vref is held at the switching timing from the H level to the L level of the pulse signal Vp, and the integrated voltage $\int$ Vref is reset immediately after that, and at the same time integration is started.

In this case, too, if the sensor reference voltage Vref is constant, the slope of the integrated voltage $\int$ Vref is also constant. When the flow rate signal Vm indicates a low flow rate, the integration period (TH+TL) becomes short, as shown in FIG. 4, so the level of the ratiometric output signal Vout becomes low, whereas when the flow rate signal Vm indicates a large flow rate, the integration period becomes long, as shown in FIG. 5, so the level of the ratiometric output signal Vout becomes high.

Though not shown, similar to the above, if the sensor reference voltage Vref rises, the slope of the integrated voltage $\int$ Vref becomes steep, so the level of the ratiometric output signal Vout becomes high, and on the contrary, if the sensor reference voltage Vref falls, the slope of the integrated voltage ∫Vref becomes gradual, so the level of the ratiometric output signal Vout becomes low.

By setting the period (TH+TL) of the sensor reference voltage Vref as the integration period, as shown in FIG. 4 and FIG. 5, the flow rate signal Vm in both the ranges of the H level period TH and the L level period TL is used as the pulse signal Vp to generate the integrated voltage ∫ Vref. As a result, a lack of flow rate information at the time of integration can be avoided. Although the hold timing of the sample hold circuit 23 is here set to the switching timing from the H level to the L level of the pulse signal Vp, it may be set to the switching timing from the L level to the H level of the pulse signal Vp.

Figure 6:
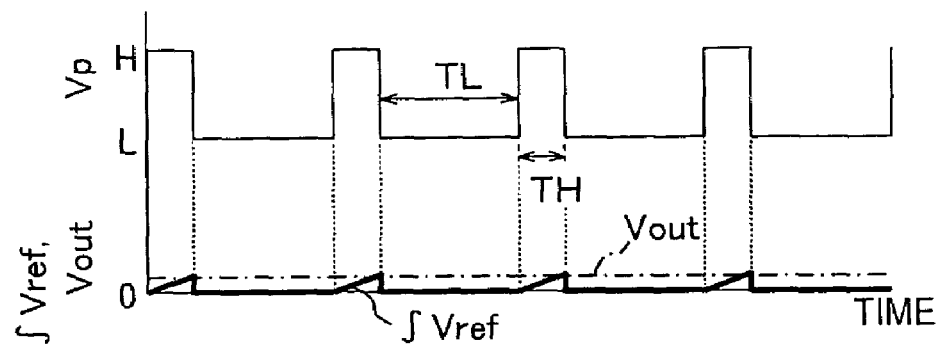
FIG. 6 is a timing chart illustrating an example of a third signal waveform when a ratiometric output is generated based on a pulse signal (PWM signal) at a low flow rate according to the first embodiment of the present invention.
Figure 7:
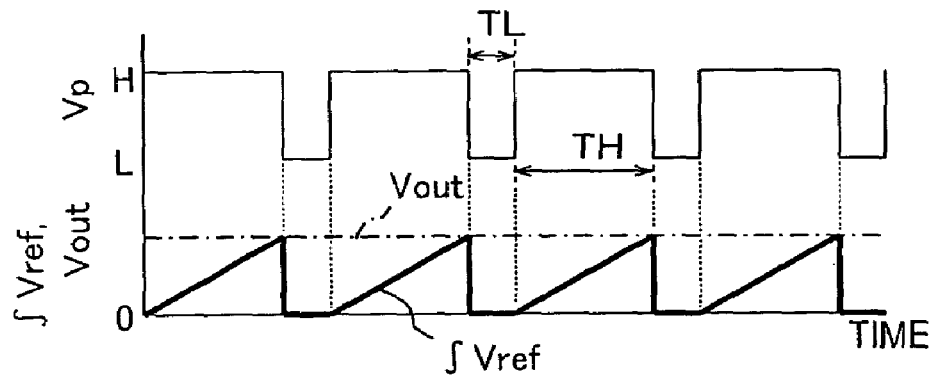
FIG. 7 is a timing chart illustrating an example of the third signal waveform when a ratiometric output is generated based on a pulse signal (PWM signal) at a large flow rate according to the first embodiment of the present invention.

Next, reference will be made to the circuit operation of FIG. 1 when the pulse signal Vp is formed of a PWM signal while referring to timing charts signal waveforms) shown in FIG. 6 and FIG. 7. FIG. 7 and FIG. 6 show signal waveforms (the pulse signal Vp, the integrated voltage ∫ Vref, and the ratiometric output signal Vout) in the case where the pulse signal Vp is formed of a PWM signal.

In this case, the H level period TH (pulse width) of the pulse signal Vp is set to a value corresponding to the level of the flow rate signal Vm, and the H level period TH becomes the integration period. FIG. 6 shows the case where the flow rate signal Vm indicates a low flow rate and the H level period TH is short, and FIG. 7 shows the case where the flow rate signal Vm indicates a large flow rate and the H level period TH is long.

In addition, in FIG. 6 and FIG. 7, the integration circuit 22 starts integration at the switching timing from the L level to the H level of the pulse signal Vp, and the sample hold circuit 23 holds the integrated voltage ∫ Vref at the switching timing from the H level to the L level. Also, the integrated voltage ∫ Vref becomes a ground state when the pulse signal Vp is at the L level TL (reset period).

Here, similar to the above, the sensor reference voltage Vref is constant, and the slope of the integrated voltage ∫ Vref in the integration period is also constant. In addition, the integration period is short at the low flow rate (FIG. 6), as shown in FIG. 6, so the level of the ratiometric output signal Vout is low, whereas the integration period is long at the large flow rate (FIG. 7), so the level of the ratiometric output signal Vout becomes high.

Though not shown, similar to the above, if the sensor reference voltage Vref rises, the slope of the integrated voltage ∫ Vref becomes steep, so the level of the ratiometric output signal Vout becomes high, whereas if the sensor reference voltage Vref falls, the slope of the integrated voltage ∫ Vref becomes gradual, so the level of the ratiometric output signal Vout becomes low. Thus, even in case where the pulse signal Vp in the form of the PWM signal is generated by the pulse output circuit 21 in FIG. 1, it is possible to achieve a circuit configuration that can generate the ratiometric output signal Vout.

According to the first embodiment (see FIG. 1) of the present invention, as shown in FIG. 2 through FIG. 5, the pulse output circuit 21 sets the mode of the pulse signal Vp as the frequency signal that has the period (TH+TL) corresponding to the flow rate signal Vm (input signal), and the integration circuit 22 sets the integration period to a duration corresponding to the H level period TH, the L level period TL, or the period (TH+TL) of the pulse signal Vp. Alternatively, as shown in FIG. 6 and FIG. 7, the pulse output circuit 21 sets the mode of the pulse signal Vp as the PWM signal that has the pulse width (the H level period TH) corresponding to the flow rate signal Vm (input signal), and the integration circuit 22 sets the integration period to a duration corresponding to the pulse width of the pulse signal Vp.

In this manner, by generating the pulse signal Vp based on the input signal (Vm) from the physical quantity detection part, and by integrating the input voltage (Vref) supplied from external equipment in response to the timing of the pulse signal Vp, and by sample holding the integrated voltage ∫ Vref, it is possible to achieve a circuit configuration of a ratiometric output specification with high precision and high responsiveness in a relatively easy and simple way. In addition, the use of the sample hold circuit 23 as a means for acquiring the ratiometric output signal Vout serves to avoid a response delay.

Embodiment 2

Figure 8:
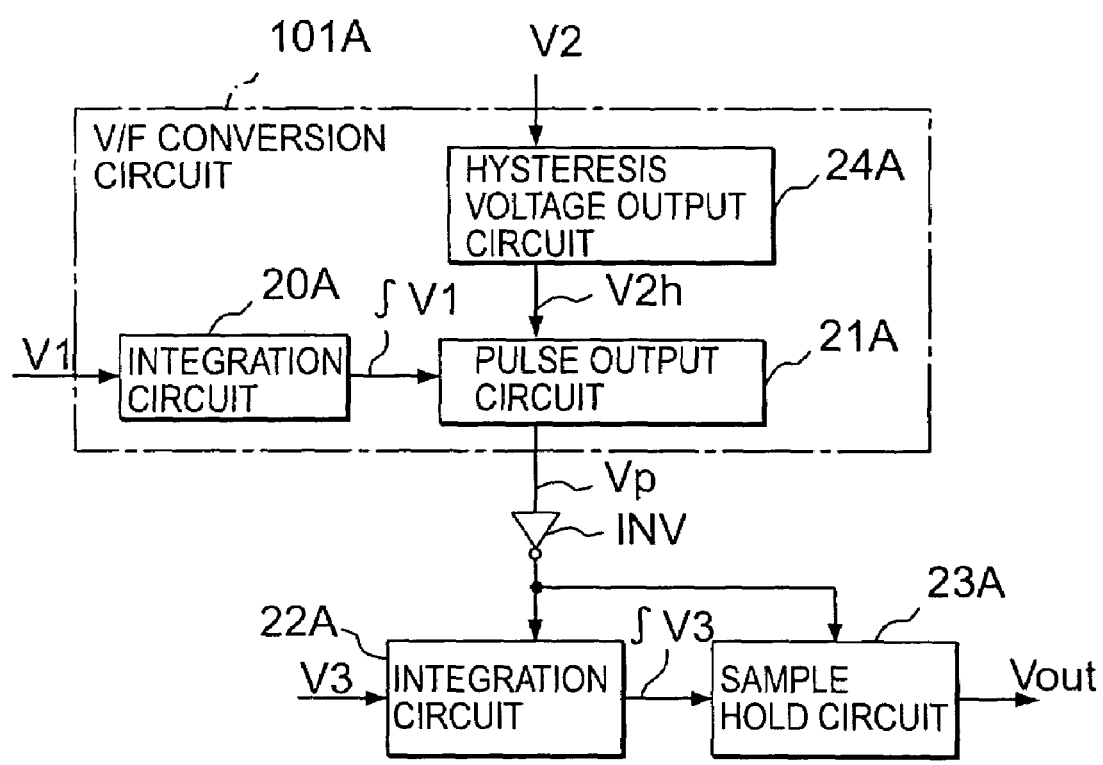
FIG. 8 is a block diagram showing an example of a ratiometric output configuration of a signal processing circuit according to a second embodiment of the present invention.

Although in the above-mentioned first embodiment, the pulse signal Vp is generated by using the pulse output circuit 21 alone, it may be generated by using a V/F conversion circuit 101A which comprises a pulse output circuit 21A, an integration circuit 20A and a hysteresis voltage output circuit 24A, as shown in FIG. 8.

Hereinafter, a second embodiment of the present invention will be described in detail while referring to the accompanying drawings.

FIG. 8 is a block diagram that illustrate a signal processing circuit according to the second embodiment of the present invention, wherein the parts or components same as those described above (see FIG. 1) are identified by the same symbols or by the same symbols with "A" affixed to their ends, while omitting a detailed explanation thereof. In FIG. 8, the V/F conversion circuit 101A that generates the pulse signal Vp includes the integration circuit 20A (first integrating part), the pulse output circuit 21A and the hysteresis voltage output circuit 24A. Here, note that the function of the hysteresis voltage output circuit 24A may be included in the pulse output circuit 21A.

A pulse signal Vp from the V/F conversion circuit 101A is input to an integration circuit 22A (second integrating part) and a sample hold circuit 23A through an inverter INV. A first voltage V1 is input to the integration circuit 20A in the V/F conversion circuit 101A, and a second voltage is input to the hysteresis voltage output circuit 24A, and a third voltage is input to the integration circuit 22A.

The integration circuit 20A integrates the first voltage V1, generates a first integrated voltage ∫ V1 that has a time slope proportional to the first voltage V1, and inputs it to the pulse output circuit 21A. The hysteresis voltage output circuit 24A specifies the second voltage V2 with hysteresis, and generates a hysteresis voltage V2h proportional to the second voltage V2, and inputs it to the pulse output circuit 21A.

The first integrated voltage ∫ V1 generated by the integration circuit 20A is integrated until it becomes equal to the hysteresis voltage V2h. The value of the hysteresis voltage V2h is determined by the second voltage V2. The pulse output circuit 21A generates the pulse signal Vp based on the first integrated voltage ∫ V1 and the hysteresis voltage V2h.

The integration circuit 22A integrates the third voltage V3 with a duration specified by the pulse signal Vp being made as its integration period, and generates a second integrated voltage ∫ V3 that has a time slope proportional the third voltage V3, and inputs it to the sample hold circuit 23A. The sample hold circuit 23 holds a difference voltage between a start voltage and an end voltage of the second integrated voltage ∫ V2 in the integration period of the integration circuit 22A, and generates a ratiometric output signal Vout.

The first integrated voltage ∫ V3 generated by the integration circuit 22A is integrated until the pulse signal Vp is provided, and it is held by the sample hold circuit 23A at the instant when the pulse signal Vp is provided, whereby it becomes the ratiometric output signal Vout.

Next, reference will be made to the signal processing circuit according to the second embodiment of the present invention while referring to FIG. 9 and FIG. 10.

Figure 9:
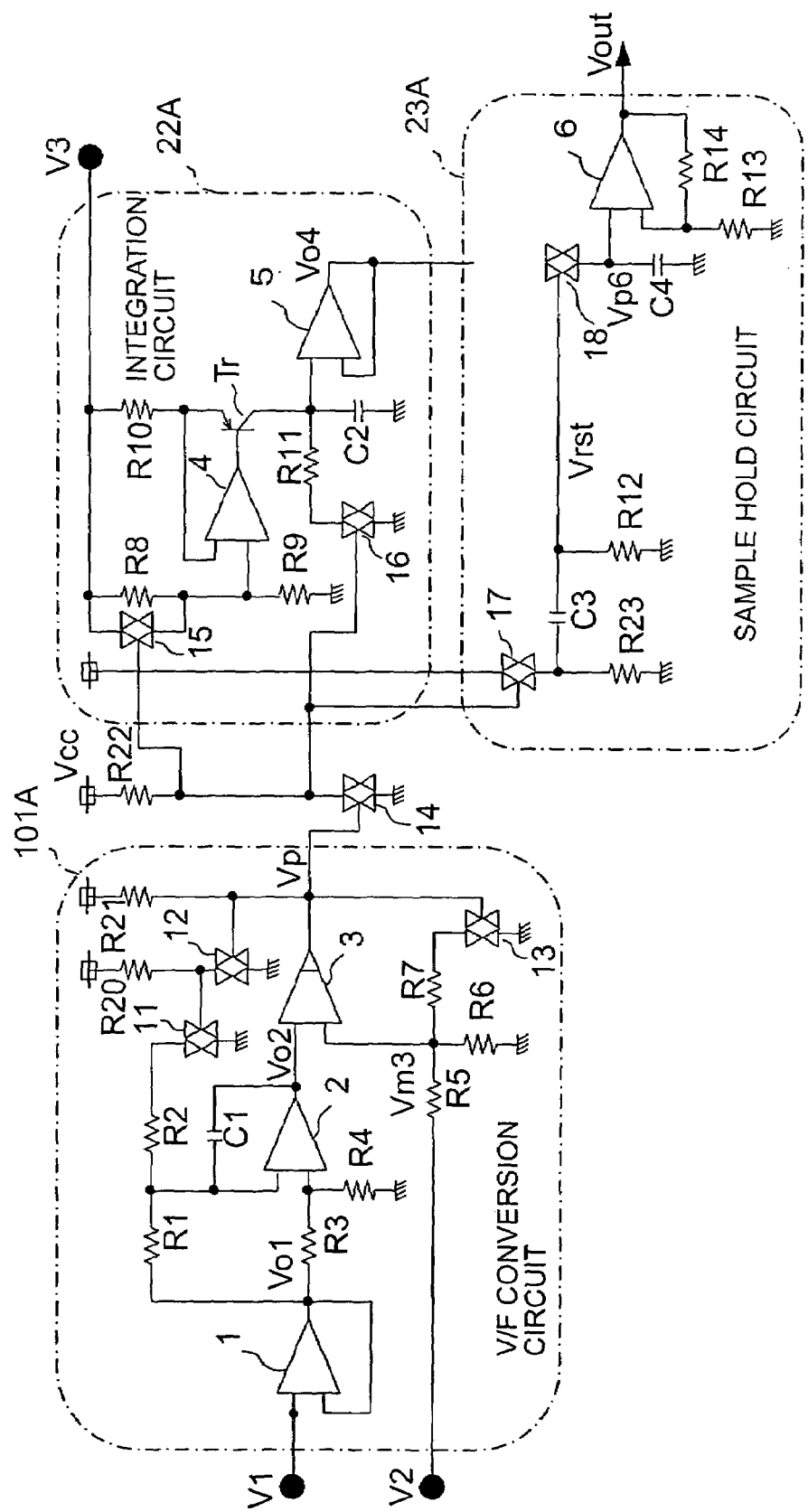
FIG. 9 is a circuit diagram illustrating an example of a concrete configuration of the signal processing circuit shown in FIG. 8.

FIG. 9 is a circuit diagram that illustrates an example of a concrete configuration of the V/F conversion circuit 101A, the integration circuit 22A and the sample hold circuit 23A in FIG. 8. FIG. 10 is a timing chart illustrating the operational waveforms of the circuit shown in FIG. 9, wherein the level changes over time of respective voltages Vo2, Vm3, Vrst, Vo4 and Vp6 are shown together with the pulse signal Vp and the ratiometric output signal Vout.

In FIG. 9, the V/F conversion circuit 101A comprises operational amplifiers 1, 2, a comparators 3, switches 11 through 13, resistors R1 through R7, R20, R21, and a capacitor C1. In this case, the operational amplifier 2 corresponds to the integration circuit 20A in FIG. 8, and the comparator 3 corresponds to the pulse output circuit 21A, and the switch 13 corresponds to the hysteresis voltage output circuit 24A.

In the V/F conversion circuit 101A, the first voltage V1 is impressed on an input terminal of the operational amplifier 1, and the second voltage V2 is impressed on an input terminal of the comparator 3 through the resistor R5. Input to the operational amplifier 1 are the first voltage V1 and its own output voltage Vo1. The output voltage Vo1 of the operational amplifier 1 is input to the operational amplifier 2 through the resistor R3, and at the same time to one end of the switch 11 through the resistors R1, R2. The switch 11 has the other end connected to a junction between one end of the resistor R20 and one end of the switch 12, of which the other end is connected to a junction between one end of the resistor R21 and the output terminal of the comparator 3. The resistors R20, R21 have their other ends connected to the power supply Vcc.

Input to the operational amplifier 2 are its own output voltage Vo2 through the capacitor C1 and a divided voltage of the output voltage Vo1 of the operational amplifier 1 which is obtained by division of the resistors R3, R2.

The output voltage Vo2 of the operational amplifier 2 (corresponding to the integrated voltage ∫ V1 in FIG. 8) is input to the comparator 3. The capacitor C1 has its one end connected to a junction between the resistors R1, R2. The comparator 3 makes a comparison between the output voltage Vo2 (integral signal) and the voltages Vm3 (reference voltage) which is obtained by dividing the second voltage V2 by the resistors R5, R6, and outputs the pulse signal Vp. The reference voltage Vm3 for the comparator 3 is input to one end of the switch 13 through the resistor R7. The other end of the switch 13 is connected to an output terminal of the comparator 3.

The switch 14 and the resistor R22 are connected between the V/F conversion circuit 101A and the integration circuit 22A. The switch 14 and the resistor R22 together constitute the inverter INV in FIG. 8. The third voltage V3 is input to one end of the switch 14 through the resistor R22. The pulse signal Vp is input to the other end of the switch 14.

The integration circuit 22A comprises operational amplifiers 4, 5, switches 15, 16, resistors R8 through R11, a capacitor C2, and a transistor Tr. The third voltage V3 is input to one end of the switch 15, of which the other end is connected to a junction between the resistor R22 and the switch 14.

Input to the operational amplifier 4 are the third voltage V3 through the resistor R10 and a voltage that is obtained by dividing the third voltage V3 by the resistors R8, R9. The resistor R8 is connected in parallel to the switch 15. The operational amplifier 4 has its output terminal connected to a base of the transistor Tr, which has an emitter connected to an input terminal of the operational amplifier 4.

The transistor Tr has a collector grounded through the capacitor C2, and connected to one end of the switch 16 through the resistor R11 and to one input terminal of the operational amplifier 5. The operational amplifier 5 has its own output terminal connected to its other input terminal so that an output voltage Vo4 is input from the outer terminal to the other input terminal in a feedback manner. A power supply Vcc is connected with the other end of the switch 16 through the resistor R22.

The sample hold circuit 23A comprises an operational amplifier 6, switches 17, 18, resistors R12 through R14, R23, and capacitors C3, C4. The power supply Vcc is connected with one end of the switch 17, which has the other end connected to the power supply Vcc through the resistor R22. The resistor R23 is inserted between the switch 17 and the ground. The capacitor C3 is inserted between one end of the resistor R23 and the switch 18. The resistor R12 is inserted between one end of the capacitor C3 and the ground to generate a voltage Vrst at a junction between the resistor R12 and the capacitor C3.

The switch 18 has one end connected to an output terminal of the operational amplifier 5 in the integration circuit 22A, and the other end grounded through a capacitor C4. A charging voltage Vp6 at one end of the capacitor C4 is input to one input terminal of an operational amplifier 6, which has the other input terminal connected to its own output terminal through the resistor R14, so that the voltage of the ratiometric output signal Vout is input from the output terminal of the operational amplifier 6 to the other input terminal thereof. The other input terminal of the operational amplifier 6 is grounded through the resistor R13.

Here, note that a physical quantity signal (e.g., flow rate signal Vm) from a physical quantity detection part (e.g., thermal flowmeter) is substituted for either of input signals such as the first through third voltages V1, V2 and V3, for example, as will be described in the following third through fifth embodiments.

Next, reference will be made to the operation of the circuit shown in FIG. 9 while referring to FIG. 10.

First of all, the operation of the V/F conversion circuit 101A will be described. The first voltage V1 impressed as an input signal onto the V/F conversion circuit 101A is turned into the output voltage Vo1 through the operational amplifier 1, and further into the output voltage Vo2 through the operational amplifier 2, which is thus converted into an integral signal.

At this time, the change over time of the output voltage Vo2 (integral signal) depends on the ON/OFF state of the switch 11. When the switch 11 is turned on, the output voltage Vo2 changes into a rising or upward direction, whereas when the switch 11 is turned off, the output voltage Vo2 changes into a falling or downward direction (see an alternate long and two short dashes line in FIG. 10). Here, assuming that the resistance values of the respective resistors R1 through R4 are R1 through R4, respectively, and the capacitance value of the capacitor C1 is C1, a voltage gradient Gu2 of the output voltage Vo2 with respect to time when the output voltage Vo2 (integral signal) changes into the rising or upward direction is represented by the following expression with the use of the first voltage V1.

$$Gu2=-\{R3/(R3+R4)\times(1/R1)-R4/(R3+R4)\times(1/R2)\}/C1\times V1$$

The voltage gradient Gu2 of the output voltage Vo2 with respect to time when the output voltage Vo2 (integral signal) changes into the falling or downward direction is represented by the following expression.

$$Gd2=-R3/(R3+R4)\times(1/R1)/C1\times V1$$

Here, it is assumed that the resistance values of the respective resistors R1 through R4 satisfy the following relations.

$$R3=R4$$

$$R1=2\times R2$$

At this time, the rising or upward voltage gradient Gu2 and the falling or downward voltage gradient Gd2 of the output voltage Vo2 (integral signal) are represented by the following expressions (1) and (2), respectively.

$$Gu2=1/(2\times C1\times R1)\times V1 \quad (1)$$

$$Gd2=-1/(2\times C1\times R1)\times V1 \quad (2)$$

In addition, the second voltage V2 impressed as an input signal onto the V/F conversion circuit 101A is input to the comparator 3 as its reference voltage Vm3. The value of the reference voltage Vm3 depends on the ON/OFF state of the switch 13, so when the switch 13 is turned on, the reference voltage Vm3 becomes a voltage value at the L (low level) side, whereas when the switch 13 is turned off, the reference voltage Vm3 becomes a voltage value on the H (high level) side.

Here, assuming that a hysteresis voltage Vhys (corresponding to V2$h$ in FIG. 8) is equal to a difference between the H side voltage value and the L side voltage value (H side voltage value–L side voltage value) of the reference voltage Vm3 and the resistance values of the respective resistors R5 through R7 are R5 through R7, respectively, the hysteresis voltage Vhys is represented by the following expression with the use of the second voltage V2.

$$Vhys=\{R6/(R5+R6)-Rp/(R5+Rp)\}\times V2$$

where Rp is a parallel resistance value of the resistors R6, R7, which is represented by the following expression.

$$Rp=(R6\times R7)/(R6+R7)$$

Here, a coefficient A of the right-hand side of the above expression is represented by the following expression.

$$A=R6/(R5+R6)-Rp/(R5+Rp)$$

Thus, the above expression is simplified, and the hysteresis voltage Vhys is represented by the following expression (3).

$$Vhys=A\times V2 \quad (3)$$

Accordingly, when the pulse signal Vp indicates an H (high level), the switch 11, the output voltage Vo2 (integral signal), the switch 13 and the reference voltage Vm3 become the following states, respectively.

Switch 11: OFF
Output voltage Vo2: Downward
Switch 13: ON
Reference voltage Vm3: L In addition, the H level period TH of the pulse signal Vp at this time is represented by the following expression (4).

$$TH = Vhys/\{1/(2\times C1\times R1)\times V1\} \quad (4)$$
$$= (2\times A\times C1\times R1)\times V2/V1$$

Moreover, the L level period TL when the pulse signal Vp indicates an L (low level) is represented similarly by the following expression (5).

$$TL=(2\times A\times C1\times R1)\times V2/V1 \quad (5)$$

Figure 10:
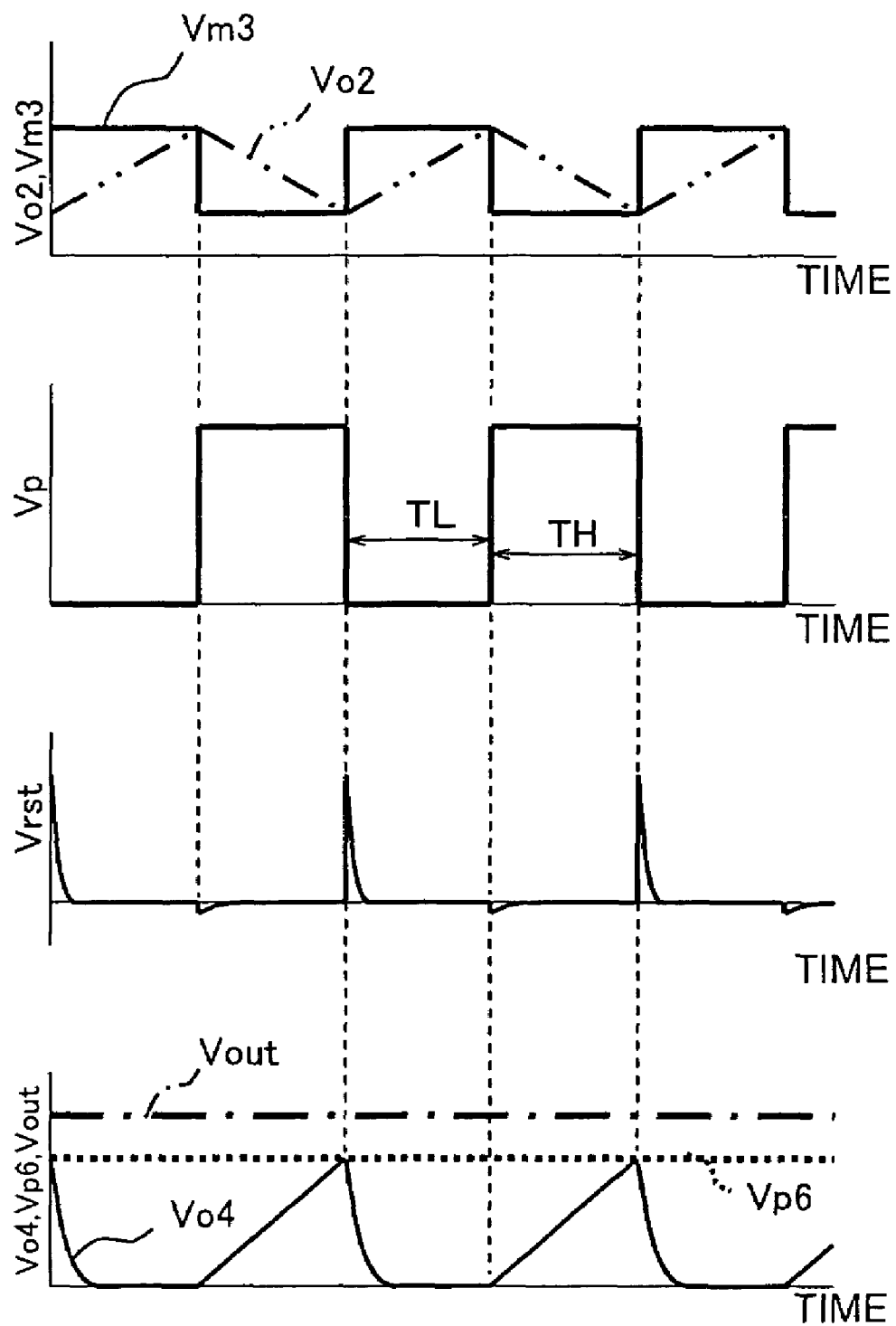
FIG. 10 is a timing chart illustrating an example of a signal waveform when a ratiometric output is generated by the signal processing circuit of FIG. 8.

That is, as shown in FIG. 10, the pulse signal Vp takes a pulse waveform of a duty of 50%, and both the H level period TH and the L level period TL of the pulse signal Vp becomes in inverse proportion to the first voltage V1 but in proportion to the second voltage V2.

Next, the integration circuit 22A in FIG. 9 will be described.

The third voltage V2 impressed as an input signal onto the integration circuit 22A is converted into the output voltage Vo4 (corresponding to the integrated voltage ∫ V3 in FIG. 8) through the operational amplifier 4. The output voltage Vo4 (integral signal) is integrated over the H level period TH in which the pulse signal Vp indicates the H level, and it is reset to 0 [V] in the L level period TL in which the pulse signal Vp indicates the L level.

Here, assuming that the resistance values of the respective resistors R8 through R10 are R8 through R10, respectively, and the capacitance value of the capacitor C2 is C2, the output voltage Vo4 (integral signal) in the duration TH in which the pulse signal Vp indicates the H level and an elapsed time t after the start of integration are represented by the following expression with the use of the third voltage V3.

$$Vo4=R8/(R8+R9)\times(1/R10)/C2\times V3\times t$$

Here, a coefficient B of the right-hand side of the above expression is represented by the following expression.

$$B=R8/(R8+R9)\times(1/R10)/C2$$

Thus, the above expression is simplified, and the output voltage Vo4 of the operational amplifier 5 (integral signal) is represented by the following expression (6).

$$Vo4=B\times V3\times t \quad (6)$$

Here, note that the output voltage Vo4 in the L level period HL in which the pulse signal Vp indicates the L level attenuates with a time constant (=R11×C2) that is determined by the resistor R11 and the capacitor C2. Accordingly, if the resistance value of the resistor R11 and the capacitance value of the capacitor C2 (i.e., constants, respectively) are selected to optimal values, respectively, the electric charge impressed on or supplied to the capacitor C2 in the L level period in which the pulse signal Vp indicates the L level is discharged to a satisfactory extent, so the output voltage Vo4 becomes 0 [V].

Next, the sample hold circuit 23A in FIG. 9 will be described.

When the voltage level of the pulse signal Vp changes from the H high) level into the L (low) level, the switch 18 in the sample hold circuit 23A is momentarily turned on. As a result, the output voltage Vo4 of the operational amplifier 5 integrated at the above timing is impressed on the capacitor C4 as a charging voltage Vp6, whereby the capacitor C4 is charged. At this time, the charging voltage Vp6, which is a voltage value at the time point when the H level period TH has elapsed, is represented by the following expression (7) from the above-mentioned expressions (4) and (6).

$$Vp6 = B \times V3 \times TH \quad (7)$$
$$= B \times V3 \times (2 \times A \times C1 \times R1) \times V2/V1$$
$$= (2 \times A \times B \times C1 \times R1) \times V2 \times V3/V1$$

In addition, the charging voltage Vp6 is amplified through the operational amplifier 6, so the ratiometric output signal Vout is represented by the following expression.

$$Vout = (2 \times A \times B \times C1 \times R1 \times (1 + R14/R13)) \times V2 \times V3/V1$$

Here, a coefficient D of the right-hand side of the above expression is represented by the following expression.

$$D = 2 \times A \times B \times C1 \times R1 \times (1 + R14/R13)$$

At this time, the ratiometric output voltage Vout is represented by the following expression (8) by the use of the first through third voltages V1 through V3.

$$Vout = D \times V2 \times V3/V1 \quad (8)$$

As can be seen from expression (8) above, the ratiometric output voltage Vout is in proportion to the second and third voltages V2, V3, but in inverse proportion to the first voltage V1.

As described above, according to the second embodiment of the present invention, the V/F conversion circuit 101A includes the integration circuit 20A that integrates the first voltage V1, the hysteresis voltage output circuit 24A that determines the hysteresis of an oscillator based on the second voltage V2, and the pulse output circuit 21A that constitutes the oscillator for generating the pulse signal Vp. In addition, the integration circuit 22A specifies the integration period at the pulse timing of the pulse signal Vp to integrate the third voltage V3, and the sample hold circuit 23A specifies the integration period to sample hold the integral signal ∫V3.

With the above arrangement, it is possible to ratiometrically output a physical quantity signal (e.g., flow rate signal Vm) with respect to a reference voltage which is supplied from external equipment, so it is possible to obtain a signal processing circuit that is capable of generating a ratiometric output signal Vout with high precision and high responsiveness. Accordingly, a thermal flowmeter can be provided which includes the ratiometric output circuit of high precision and high responsiveness. In addition, the use of the sample hold circuit 23A so as to generate the ratiometric output signal Vout serves to provide an advantageous effect of no response delay being generated.

Embodiment 3

Figure 11:
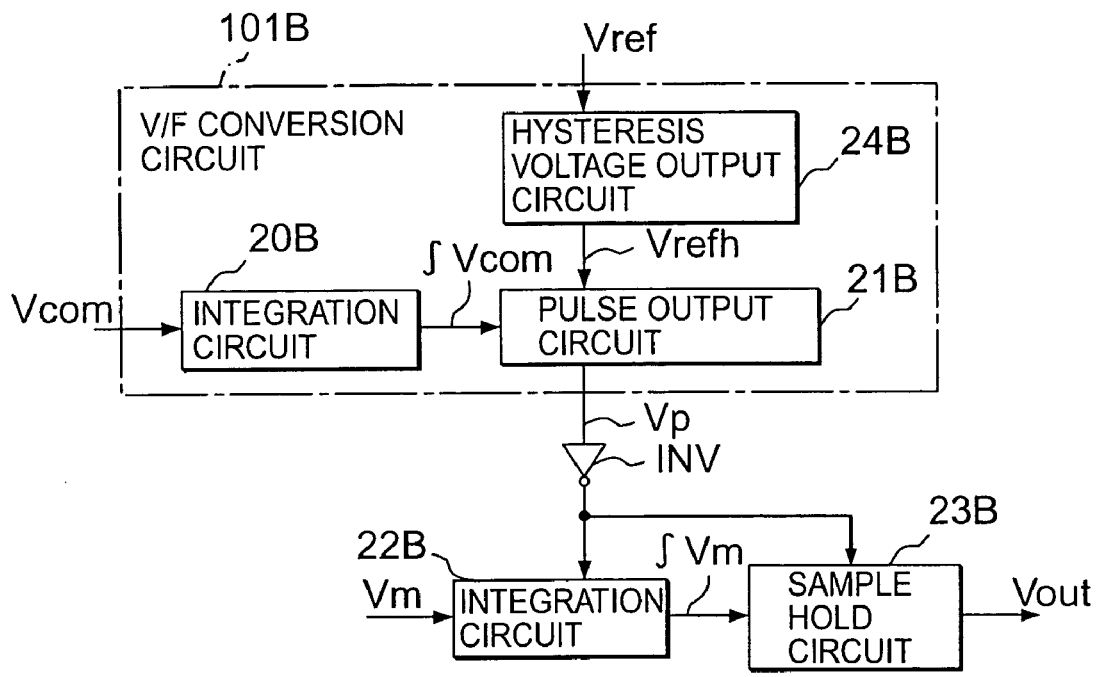
FIG. 11 is a block diagram showing an example of a ratiometric output configuration of a signal processing circuit according to a third embodiment of the present invention.

Though in the above-mentioned second embodiment, no mention is made to the concrete examples of the respective voltages V1 through V3, the first voltage V1 may be set as a fixed voltage Vcom, the second voltage V2 may be set as the sensor reference voltage Vref, and the third voltage V3 may be set as the flow rate signal Vm, as shown in FIG. 11.

Hereinafter, a third embodiment of the present invention will be described in detail while referring to FIG. 11. FIG. 11 is a block diagram that shows a signal processing circuit according to the third embodiment of the present invention, wherein the parts or components same as those described above (see FIG. 8) are identified by the same symbols or by the same symbols with "B" affixed to their ends, while omitting a detailed explanation thereof.

In FIG. 11, a fixed voltage Vcom is input to an integration circuit 20B in a V/F conversion circuit 101B, and the integration circuit 20B integrates the fixed voltage Vcom to generate an integral signal ∫Vcom that has a slope proportional to the fixed voltage Vcom.

On the other hand, a sensor reference voltage Vref from a fuel control system (not shown) is input to a hysteresis voltage output circuit 24B, which then generates a hysteresis voltage Vrefh proportional to the sensor reference voltage Vref. Also, a flow rate signal Vm (physical quantity signal) detected by an external thermal flowmeter (not shown) is input to the integration circuit 22B.

A pulse output circuit 21B in the V/F conversion circuit 101B generates a pulse signal Vp based on the integrated voltage ∫Vcom and the hysteresis voltage Vrefh. The integration circuit 22B generates an integral signal ∫Vm that has a slope proportional to the flow rate signal Vm. A sample hold circuit 23B generates a ratiometric output signal Vout from the integrated voltage ∫Vm and the pulse signal Vp.

In this case, since the respective voltages V1 through V3 are made to correspond to Vcom, Vref and Vm, respectively, the ratiometric output signal Vout can be represented as the following expression (9) from the above-mentioned expression (8).

$$Vout = D \times Vref \times Vm/Vcom \quad (9)$$

That is, the ratiometric output signal Vout becomes a value which is in proportion to the product of the flow rate signal Vm and the sensor reference voltage Vref. As a result, the sample hold circuit 23B outputs the flow rate signal Vm with respect to the sensor reference voltage Vref in a ratiometric manner.

Accordingly, in the third embodiment of the present invention, too, it is possible to achieve the operational effects equivalent to those as stated above. That is, by selecting a combination of the first through third voltages (input signals) V1 through V3 from the flow rate signal Vm (the physical quantity signal output from the physical quantity detection part), the fixed voltage Vcom and the sensor reference voltage Vref (the reference signal supplied from the external equipment), it is possible to achieve a ratiometric output specification. In addition, as stated above, the use of the sample hold circuit 23B to generate the ratiometric output signal Vout serves to avoid a response delay.

Embodiment 4

Figure 12:
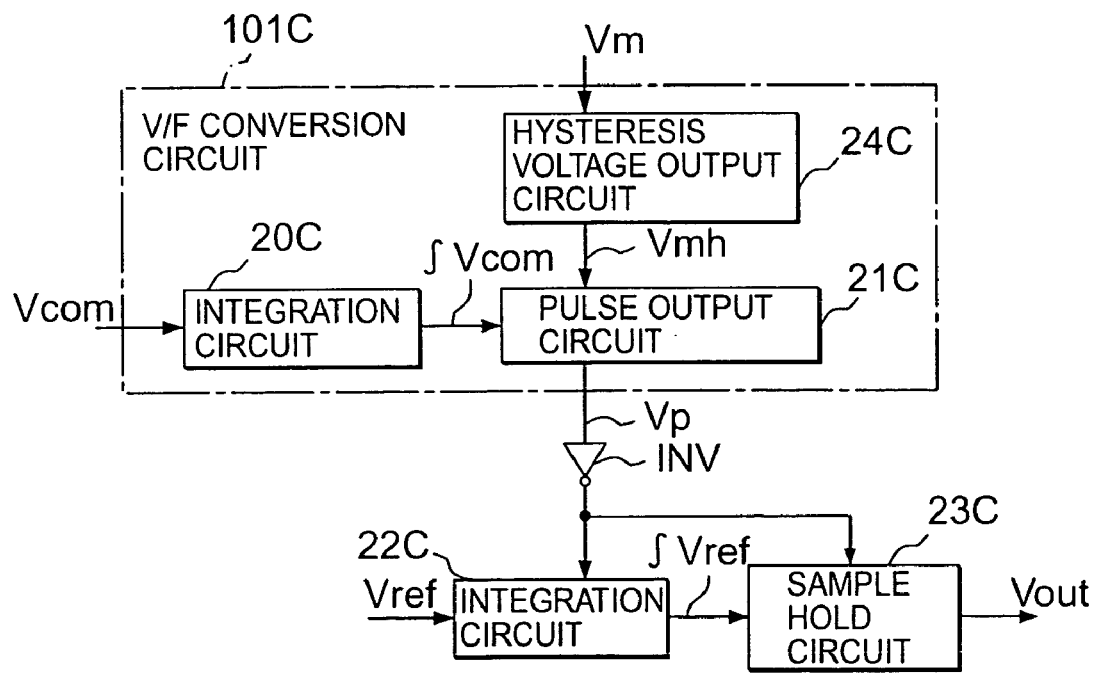
FIG. 12 is a block diagram showing an example of a ratiometric output configuration of a signal processing circuit according to a fourth embodiment of the present invention.

Although in the above-mentioned third embodiment, the second and third voltages V2 and V3 are made to correspond to the sensor reference voltage Vref and the flow rate signal Vm, respectively, the respective input signals may be exchanged with one another, as shown in FIG. 12, so that the second voltage V2 is set as the flow rate signal Vm, and the third voltage V3 is set as the sensor reference voltage Vref.

Hereinafter, a fourth embodiment of the present invention will be described in detail while referring to FIG. 12. FIG. 12 is a block diagram that shows a signal processing circuit according to the fourth embodiment of the present invention, wherein the parts or components same as those described above (see FIG. 11) are identified by the same symbols or by the same symbols with "C" affixed to their ends, while omitting a detailed explanation thereof.

In FIG. 12, a flow rate signal Vm is input to a hysteresis voltage output circuit 24C in a V/F conversion circuit 101C, and a sensor reference voltage Vref is input to an integration circuit 22C. The hysteresis voltage output circuit 24C generates a hysteresis voltage Vmh proportional to the flow rate signal Vm.

A pulse output circuit 21C in the V/F conversion circuit 101C generates a pulse signal Vp based on an integrated voltage ∫ Vcom from an integration circuit 20C and the hysteresis voltage Vmh. The integration circuit 22C generates an integral signal ∫ Vref that has a slope proportional to the sensor reference voltage Vref. A sample hold circuit 23C generates a ratiometric output signal Vout from the integrated voltage ∫ Vref and the pulse signal Vp.

In this case, since the respective voltages V1 through V3 are made to correspond to Vcom, Vm and Vref, respectively, the ratiometric output signal Vout can be represented as the following expression (10) from the above-mentioned expression (8).

$$Vout = D \times Vm \times Vref/Vcom \qquad (10)$$

That is, the ratiometric output signal Vout becomes a value which is in proportion to the product of the flow rate signal Vm and the sensor reference voltage Vref. As a result, the sample hold circuit 23C outputs the flow rate signal Vm with respect to the sensor reference voltage Vref in a ratiometric manner, as stated above.

As a result, in the fourth embodiment of the present invention, too, it is possible to achieve the operational effects equivalent to those as stated above. That is, by selecting a combination of the first through third voltages (input signals) V1 through V3 from the flow rate signal Vm (the physical quantity signal output from the physical quantity detection part), the fixed voltage Vcom and the sensor reference voltage Vref (the reference signal supplied from the external equipment), it is possible to achieve a ratiometric output specification. In addition, as stated above, the use of the sample hold circuit 23C to generate the ratiometric output signal Vout serves to avoid a response delay.

Moreover, the integration circuit 22C has a similar circuit configuration as stated above (see FIG. 9), so the integrated voltage ∫ Vref operates as the above-mentioned output voltage Vo4 (see FIG. 10). Also, it is generally known that the sensor reference voltage Vref is higher than and less in voltage variation than the flow rate signal Vm. Accordingly, when the sensor reference voltage Vref is integrated, as shown in FIG. 12, it is possible to easily set each circuit constant so as to put the integrated value thus obtained within an input range in which it can operate in the integration circuit 22C, in comparison with the case where the flow rate signal Vm is integrated (in the above-mentioned third embodiment).

Embodiment 5

Figure 13:
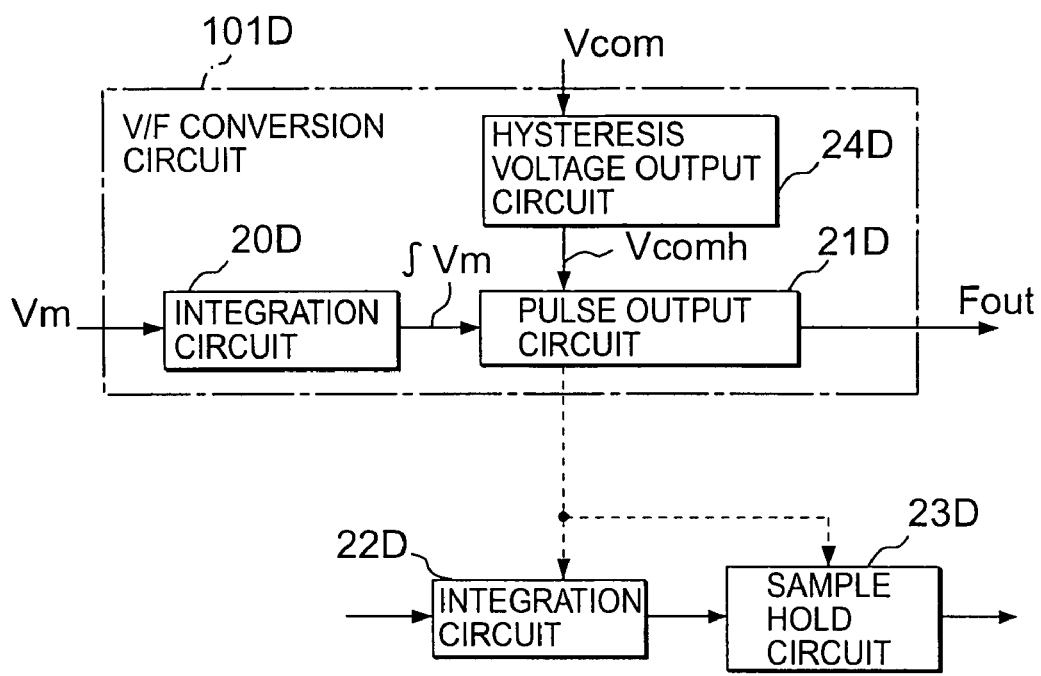
FIG. 13 is a block diagram showing an example of a ratiometric output configuration of a signal processing circuit according to a fifth embodiment of the present invention.

Although in the above-mentioned third and fourth embodiments, the first voltage V1 is set as the fixed voltage Vcom, the first voltage V1 may be set as the flow rate signal Vm, and the second voltage V2 may be set as the fixed voltage Vcom, as FIG. 13.

Hereinafter, a fifth embodiment of the present invention will be described in detail while referring to FIG. 13. FIG. 13 is a block diagram that shows a signal processing circuit according to the fifth embodiment of the present invention, wherein the parts or components same as those described above (see FIG. 11 and FIG. 12) are identified by the same symbols or by the same symbols with "D" affixed to their ends, while omitting a detailed explanation thereof.

In FIG. 13, a flow rate signal Vm (physical quantity signal) is input to an integration circuit 20D in a V/F conversion circuit 101D. The integration circuit 20D generates an integral signal ∫ Vm that has a slope proportional to the flow rate signal Vm, and inputs it to the pulse output circuit 21D. On the other hand, a fixed voltage Vcom is input to a hysteresis voltage output circuit 24D, which generates a hysteresis voltage Vcomh proportional to the fixed voltage Vcom, and inputs it to the pulse output circuit 21D.

The pulse output circuit 21D outputs a frequency signal Fout corresponding to the flow rate signal Vm from the hysteresis voltage Vcomh proportional to the fixed voltage Vcom and the integral signal ∫ Vm that has a slope proportional to the flow rate signal Vm. In FIG. 13, the frequency signal Fout can be output by the V/F conversion circuit 101D alone with the use of a similar circuit configuration as described above (see FIG. 8 through FIG. 12).

In this case, for example, in the configuration of the V/F conversion circuit 101A shown in FIG. 8, the first voltage V1 is made to correspond to the flow rate signal Vm, and the second voltage V2 is made to correspond to the fixed voltage Vcom. That is, only configurations that correspond to the V/F conversion circuits 101B and 101C in FIG. 9 and FIG. 10 are used.

Here, the period T of the pulse signal Vp is represented as the following expression (11) from the above-mentioned expressions (4), (5).

$$T = TH + TL \qquad (11)$$
$$= 2 \times (2 \times A \times C1 \times R1) \times Vcom/Vm$$

In addition, the frequency F of the pulse signal Vp is represented by the following expression (12).

$$F = 1/T = (1/(4 \times A \times C1 \times R1 \times Vcom)) \times Vm \qquad (12)$$

As can be seen from expression (12) above, the frequency F is proportional to the flow rate signal Vm, and it is possible to easily change the circuit into a frequency output specification by using the above-mentioned circuit configuration. That is, the frequency signal Fout can be easily output only by appropriately changing the signal input to the V/F conversion circuit 101D on the basis of a ratiometric output configuration (i.e., changing the first voltage V1 and the second voltage V2 to the flow rate signal Vm and the fixed voltage Vcom, respectively).

As described above, according to the fifth embodiment of the present invention, it is possible to provide a thermal flowmeter including a ratiometric output circuit of high precision and high responsiveness, and it is also possible to easily change the circuit to the frequency output specification. That is, by switching the configuration of an input signal, the output mode of an output signal can be changed between the ratiometric output signal Vout and the frequency signal Fout.

While the invention has been described in terms of preferred embodiments, those skilled in the art will recognize that the invention can be practiced with modifications within the spirit and scope of the appended claims.

What is claimed is:

1. A signal processing circuit comprising:
    a pulse generation part that generates a pulse signal corresponding to an input signal;

an integration part that generates an integrated voltage having a time slope proportional to an input voltage with a duration specified by said pulse signal being set as an integration period; and a hold part that holds and outputs a difference voltage between a start voltage and an end voltage of said integrated voltage in said integration period.

2. The signal processing circuit as set forth in claim 1, wherein said pulse generation part sets a mode of said pulse signal as a frequency signal having a period corresponding to said input signal; and said integration part sets said integration period so as to correspond to an H level period, an L level period, or a period of said pulse signal.

3. The signal processing circuit as set forth in claim 1, wherein said pulse generation part sets a mode of said pulse signal as a PWM signal having a pulse width corresponding to said input signal; and said integration part sets said integration period to a period corresponding to said pulse width.

4. A signal processing circuit comprising:

a first integration part that generates an integrated voltage having a time slope proportional to a first voltage;

a hysteresis voltage generation part that generates a hysteresis voltage proportional to a second voltage;

a pulse generation part that generates a pulse signal based on said first integrated voltage and said hysteresis voltage;

a second integration part that generates a second integrated voltage having a time slope proportional to a third voltage with a duration specified by said pulse signal being set as an integration period; and a hold part that holds and outputs a difference voltage between a start voltage and an end voltage of said second integrated voltage in said integration period.

5. The signal processing circuit as set forth in claim 4, wherein said first voltage comprises a fixed voltage;

said second voltage comprises a reference voltage supplied from external equipment;

said third voltage comprises a physical quantity signal detected by an external physical quantity detection part; and said hold part ratiometrically outputs said physical quantity signal with respect to said reference voltage.

6. The signal processing circuit as set forth in claim 4, wherein said first voltage comprises a fixed voltage;

said second voltage comprises a physical quantity signal detected by an external physical quantity detection part;

said third voltage comprises a reference voltage supplied from external equipment; and said hold part ratiometrically outputs said physical quantity signal with respect to said reference voltage.

7. The signal processing circuit as set forth in claim 4, wherein said first voltage comprises a physical quantity signal detected by an external physical quantity detection part;

said second voltage comprises a fixed voltage; and said pulse generation part outputs a frequency signal corresponding to said physical quantity signal.

* * * * *